United States Patent
Stocchiero

[11] Patent Number: 6,033,802
[45] Date of Patent: Mar. 7, 2000

[54] SEALING TUBULAR ELEMENT FOR THE POLES OF ELECTRIC ACCUMULATORS

[76] Inventor: Olimpio Stocchiero, Via Kennedy 5, 36050 Montorso Vicentino (VI), Italy

[21] Appl. No.: 08/911,140

[22] Filed: Aug. 14, 1997

Related U.S. Application Data

[63] Continuation of application No. PCT/EP96/05836, Dec. 24, 1996.

[30] Foreign Application Priority Data

Dec. 28, 1995 [IT] Italy ................ VI950084 U

[51] Int. Cl.[7] .................................................. H01M 2/08
[52] U.S. Cl. ........................................................ 429/180
[58] Field of Search ................................ 429/180, 181, 429/184, 185

[56] References Cited

U.S. PATENT DOCUMENTS

| | | | |
|---|---|---|---|
| 1,506,466 | 8/1924 | Walter | 429/180 |
| 1,600,442 | 9/1926 | Willard | 429/180 |
| 3,652,340 | 3/1972 | Sharpe et al. | 429/184 |
| 4,212,934 | 7/1980 | Salamon | 429/181 |
| 5,053,296 | 10/1991 | Stocchiero | 429/180 |
| 5,364,714 | 11/1994 | Gürtler | 429/178 |

FOREIGN PATENT DOCUMENTS

| | | |
|---|---|---|
| 0319741 | 6/1989 | European Pat. Off. . |
| 0399247 | 11/1990 | European Pat. Off. . |
| 0453648 | 10/1991 | European Pat. Off. . |
| WO22178 | 8/1995 | WIPO . |

OTHER PUBLICATIONS

Patent abstracts of Japan vol. 114, No. 222, Feb. 23, 1990 JP–02–054861.

*Primary Examiner*—Maria Nuzzolillo
*Assistant Examiner*—Susy Tsang
*Attorney, Agent, or Firm*—Watson Cole Grindle Watson P.L.L.C.

[57] ABSTRACT

The invention discloses a sealing element (1; 100) for the poles (2) of electric accumulators consisting of a tubular body (10) which presents a through-hole (7; 70) lodging said pole (2) and which is provided with at least one collar (25; 125) matching by interference against the outer lateral surface (23) of said pole (2), in order to ensure the sealing when said tubular body (10) is externally coupled with said pole and internally with a seat (3) obtained in the lid (5) of the accumulator and peripherically to the hole (4) for the passage of said pole (2).

2 Claims, 2 Drawing Sheets

SEALING TUBULAR ELEMENT FOR THE POLES OF ELECTRIC ACCUMULATORS

CROSS REFERENCE TO RELATED APPLICATION

This application is a continuation of International Application, Ser. No. PCT/EP96/05836. Filed Dec. 24, 1996, identifying the United States as a designated state.

BACKGROUND OF THE INVENTION

The present invention concerns a sealing tubular element, particularly suited to be applied to the poles of electric accumulators. It is a known fact that the inner elements of electric accumulators are connected to at least one pair of poles, one of them being positive and the other one negative, protruding from the lid of the container wherein said elements are contained, to which the electric conductors supplying power to corresponding engine are connected.

It is also a known fact that said poles consist of bodies having an essentially cylindrical shape which are provided with connecting means, suited to connect each pole to its respective cable supplying the corresponding engine, and with sealing mechanisms, co-operating with each pole and with the lid of the container wherein the elements are contained, suited to prevent the leaking out of electrolyte.

In particular, according to the known embodiments, the upper part of the pole is arranged passing through the corresponding hole drilled in the lid to which it is secured by means of a sealing ring-nut which can be threaded on the pole or on the lid, if the pole or the lid are threaded, or it can be cylindrical and inserted by pressure, if the pole or the lid are not threaded. Once said ring-nuts have been mounted, they produce the compression of the gaskets with which the pole is provided, thus realizing the seal for the electrolyte.

Ring-nuts inserted by pressure are usually preferred to threaded ring-nuts, since they make it unnecessary to have to realize threaded poles and seats of lids which are more costly and also because said ring-nuts can sometimes act as sealing gaskets for the electrolyte, if they are made of rubber.

The described sealing ring-nuts belonging to the known type present, however, the inconvenience in that they are mounted with interference on their respective poles and during the assembly they discharge on the inner elements of the accumulator all the stresses which are exerted on them because of the coupling process. These stresses can mechanically deform the elements of the accumulator, thus damaging them.

SUMMARY OF THE INVENTION

The present invention proposes to overcome such an inconvenience and has the purpose of realizing a sealing element for the poles of electric accumulators which can be mounted without mechanically stressing the elements.

Another purpose is to perform the coupling much more easily.

Another purpose is to permit the elimination of all the sealing gaskets which in the embodiments belonging to the known technique are interposed between the ring-nut and the pole.

The just-described purposes are reached with the realization of a sealing element for the poles of electric accumulators which, in accordance with the main claim, consists of a tubular body suited to be externally coupled with the pole and to be lodged in an annular seat which is present peripherally to the hole for the passage of said pole in the lid of the container holding the elements of said accumulator and is characterized in that said tubular body presents a through-hole lodging said pole and which is provided with at least one collar matching by interference against the outer lateral surface of said pole, in order to ensure the sealing when said tubular body is externally coupled with said pole and internally with said seat.

According to a preferred embodiment, the tubular element according to the present invention is made of rubber and presents externally annular projections which ensure the sealing against the wall of the seat of the lid within which it is lodged.

Advantageously, the use of the sealing tubular element according to the invention makes it possible not to mechanically stress the accumulator elements during the assembly process. Moreover, the assembling operations are simpler, faster and, therefore, less costly.

Also advantageously, the manufacture of the sealing tubular element according to the invention is also less costly.

Another advantage is that, since the sealing element is made of elastic material, preferably of anti-acid rubber or EPDM or similar, and is itself the sealing element, it makes it possible to do away with the gaskets, which would be necessary if ring-nuts belonging to the known technique were used.

Moreover, it also permits the deformation of the poles which occurs while in operation.

BRIEF DESCRIPTION OF THE DRAWINGS

Further scope of applicability of the present invention will become apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description and from the drawings, wherein.

DESCRIPTION OF THE INVENTION

Figure 1:
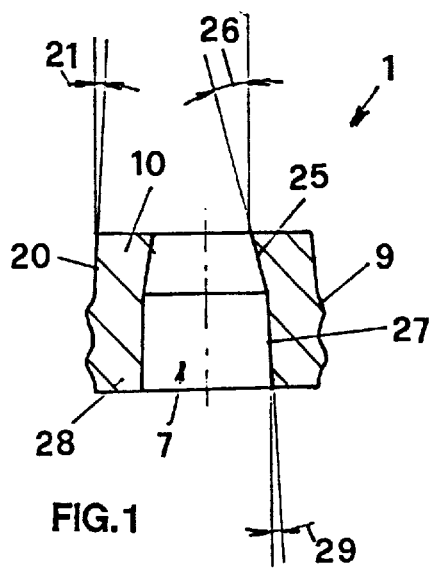
FIG. 1 shows the sealing tubular element forming the object of present invention.
Figure 3:
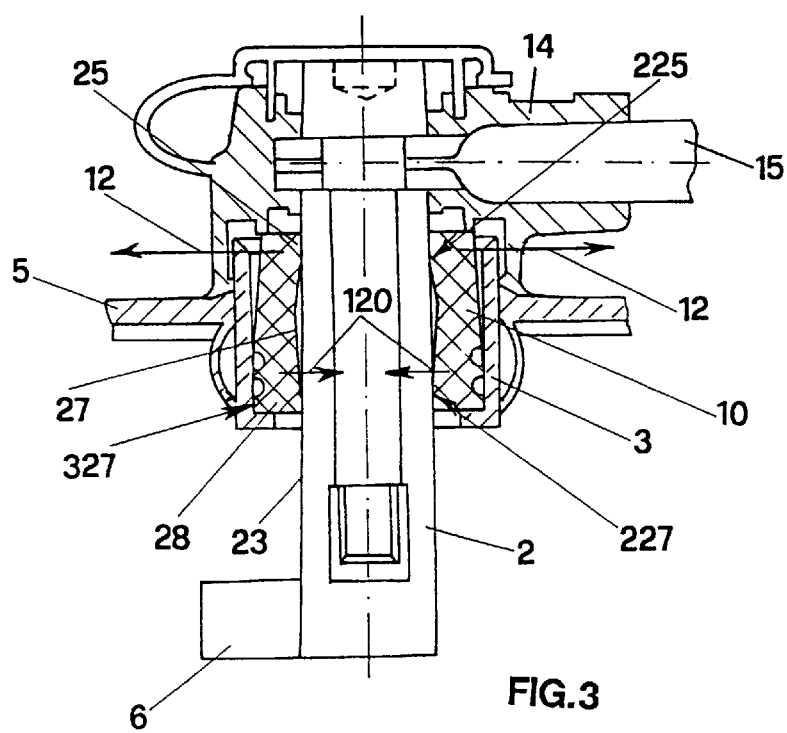
FIG. 3 shows the sealing tubular element according to the invention applied on the pole and on the lid of the accumulator in an assembled view.
Figure 2:
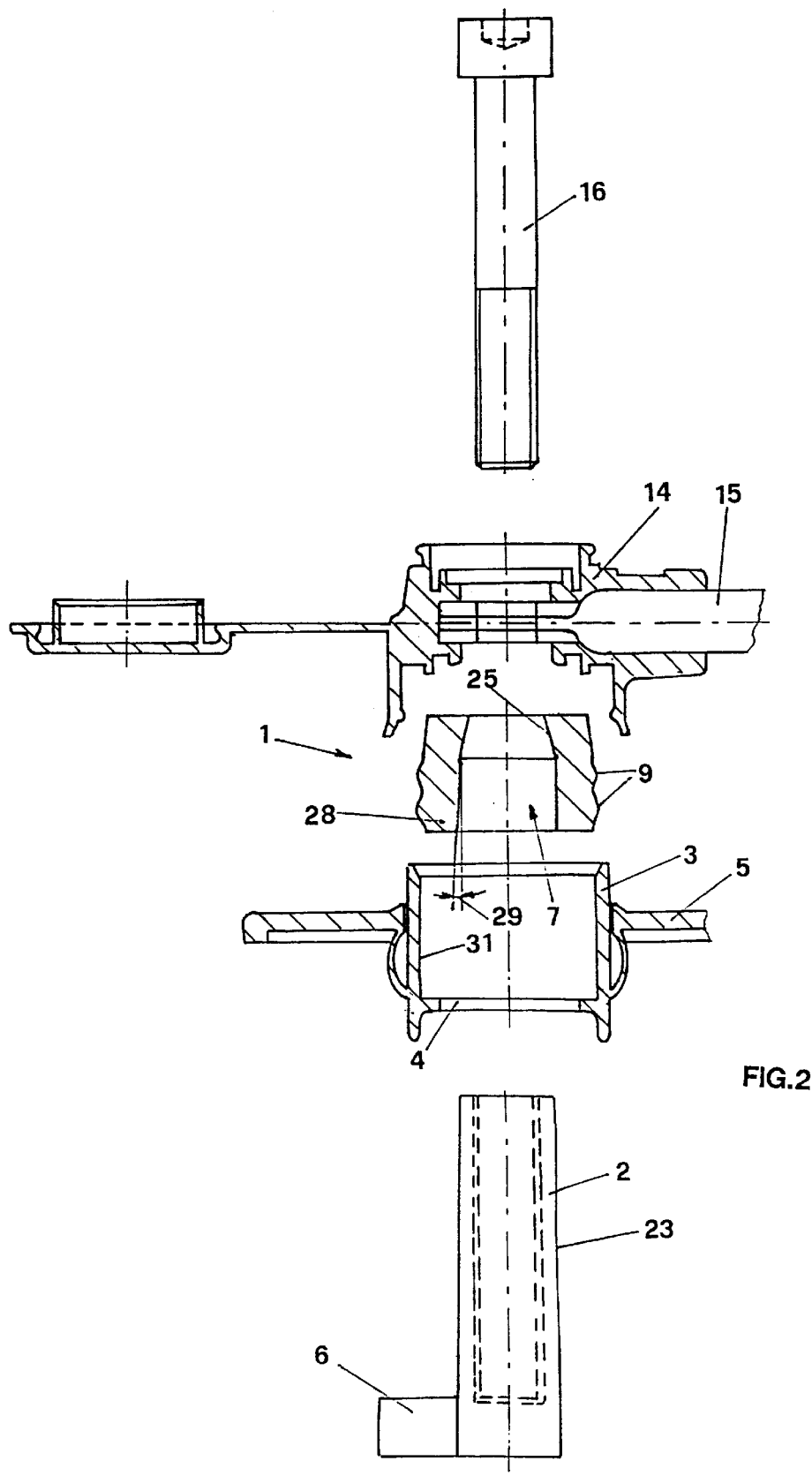
FIG. 2 represents the sealing tubular element according to the invention coupled with the pole and the lid of the accumulator, represented in an exploded view.

As can be observed in FIG. 1, the sealing element according to the invention, which is indicated as a whole with 1, consists of a tubular body 10 which, as can also be observed in FIG. 2 and in FIG. 3, is coupled externally with pole 2 of the accumulator and internally with an annular seat 3 obtained peripherally to hole 4 for the passage of said pole 2, drilled in lid 5 of the container, not represented in the drawing, within which the elements 6 of the accumulator are arranged.

In FIG. 1 it can be observed that the tubular body 10 of said tubular element 1 presents a through-hole 7 through which it couples itself with pole 2 there, where the inner surface 27 of said hole presents a profile having the shape of an essentially truncated cone having an angle of inclination 29 diverging toward the elements 6 of the accumulator with which pole 2 is connected.

In a similar way, at least one part of the outer surface 20 of the same tubular body 10 presents the essential shape of a truncated cone having an angle of inclination 21 also diverging toward the same elements 6 of the accumulator. Moreover, at the upper end of said tubular body 10 and in correspondence with the inner part of pole 7 there is a collar 25 having the profile of an essentially truncated cone which presents an inclination 26 diverging toward the elements 6 of the accumulator and having a greater value as compared with the inclination 29 of the inner surface 27 of the same hole 7.

Moreover, the tubular element 1 presents externally a plurality of projections 9 suited to co-operate in order to create a seal against wall 31 of the annular seat 3.

According to a different embodiment, the tubular element 1 can also be without said annular projections 9 and its external surface can be completely smooth, slanted at an angle 21 or it can also be cylindrical. Moreover, the inner surface 27 of hole 7, instead of being slanted at an angle 29, can also be cylindrical.

After lid 5 has been coupled with the container and pole 2 has been inserted through hole 4, the tubular element 1 is slid over the exterior of pole 2. During the coupling process, surface 27 of hole 7 of the tubular element 1 is slidingly coupled without interference with pole 2, since it presents a larger diameter than pole 2 itself. On the contrary, collar 25 contrasts against pole 2 which radially expands the tubular element 10 in the direction 12, as can be observed in FIG. 3. Said radial expansion 12 entails in turn a radial shrinking of the tubular element 10 itself following direction 120 in correspondence with the annular area 28 located on the opposite side of collar 25.

Thus, between pole 2 and the tubular element 10 an upper sealing area 225, which is located in correspondence with the collar 25, and a lower sealing area 227, arranged in correspondence with the annular area 28, placed on the opposite side of collar 25, are created. Moreover, always in correspondence with said annular area 28, the outer surface of the tubular element 1 creates together with seat 3 of lid 5, which lodges the tubular element 1, a sealing area 327 on the opposite side of the lower sealing area 227.

With regard to the inner surface 27 of hole 7 of the tubular element 1, it does not interfere with the body of pole 2, as can be observed in FIG. 3, and therefore, it allows the latter to slide in its interior.

Finally, the outer surface of the tubular element 1 presses against wall 31 of the annular seat 3 through the annular projection 9 with which it is provided, thus creating a seal.

The connection is perfected by means of cover 14 protecting the electric cable 15 and of the securing screw 16.

Figure 4:
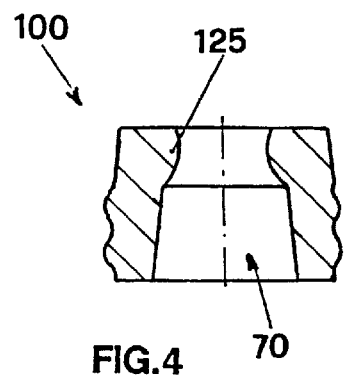
FIG. 4 shows a different embodiment of the tubular element according to the invention.

A different embodiment of the sealing element according to the invention is represented in FIG. 4, wherein it can be observed that said sealing element, indicated as a whole with 100, presents the sealing collar 125 against the pole and it consists of a projecting ring facing the interior of hole 70 of said sealing element 100.

In another embodiment, not represented in the drawing, the sealing element according to the invention may present a smooth outer surface or eventually even a cylindrical shape. Even part of the lateral surface of its inner hole, which extends beyond the collar which creates the interference against the pole, may present a cylindrical shape.

The sealing tubular element 1 is preferably made of anti-acid rubber having a suitable elasticity or of EPDM or similar, so as to allow an easy application and to ensure an excellent hydraulic seal.

In such a way, it is possible to eliminate all the sealing gaskets which are also used in the realizations belonging to the known technique. Moreover, the elasticity of the material of which the sealing element is made, makes possible the deformation of the poles which, as it is known, occurs while the accumulator is in operation.

On the basis of what has been said, it is easy to understand that the sealing element according to the invention reaches all the proposed purposes. During the manufacturing process the sealing element according to the invention may acquire any shape and dimensions, which must all fall within the spirit and scope of the present invention.

I claim:

1. A sealing element for use in an accumulator having a lid, said sealing element for sealing an annular space formed between an upper cylindrical end of a cylindrical pole of the accumulator and an annular seat formed in the lid comprising:

a deformable tubular body formed of an elastic material having an outer wall, at least one integral projecting portion extending from the outer wall of the body for engaging the seat with an interference fit, an upper end, a lower end, and said tubular body having an axial through hole for receiving the upper end of the pole therein, said through hole formed with an upper portion having the shape of a truncated cone outwardly diverging in a direction away from the upper end of the pole and having an upper circular opening of the truncated cone sized for intimate sealing engagement with said upper end of the pole, said hole further formed with a cylindrical lower portion axially aligned with the circular opening, said intimate sealing engagement of the upper end of the pole and the upper opening of the truncated cone deforming the upper end of the body and causing the lower end of the body to form a seal about the upper end of the pole.

2. An accumulator having a sealing element for sealing an annular space between an upper cylindrical end portion of a pole of the accumulator and a seat in a lid of the accumulator having a cylindrical wall and a central opening for receiving the upper end portion of the pole extending through the opening, said sealing element comprising:

an annular member formed of an elastic material having upper and lower ends, an outer cylindrical wall and at least one integral projecting rib extending from the outer wall for intimately and sealably engaging the cylindrical wall of the seat, said member further having a through hole opening formed with a first inner wall portion in the upper end of the member and a second inner wall portion in the lower end of the member, said first wall portion being deformable and having an upper end and a lower end diverging inwardly towards the upper end having a circular opening sized to be deformed for intimate sealing engagement with the cylindrical portion of the pole, said second wall portion formed in the shape of a cylinder being axially aligned with the circular opening and sealably engaging the cylindrical portion of the pole at the lower end of the annular member as the upper end of the annular member is deformed from said intimate sealing engagement of the cylindrical portion of the pole and the circular opening.

* * * * *